Jan. 10, 1967   R. M. TUCK   3,296,891
TRANSMISSION
Filed June 13, 1963

INVENTOR.
Robert M. Tuck
BY
A. M. Heiter
ATTORNEY

United States Patent Office

3,296,891
Patented Jan. 10, 1967

3,296,891
TRANSMISSION
Robert M. Tuck, Indianapolis, Ind., assignor to General Motors Corporation, Detroit, Mich., a corporation of Delaware
Filed June 13, 1963, Ser. No. 287,595
19 Claims. (Cl. 74—677)

This invention relates to a transmission and more particularly to a torque converter transmission having a twin turbine unit, a converter gear set and a multiratio gear unit providing torque converter drives and split torque drive.

Hydrodynamic torque converters used in transmissions as torque multipliers have certain advantages since they can provide infinitely variable speed and torque variations within limited ranges. When a torque converter is combined with drive ratio gearing, such as planetary gearing, its limited torque ranges can be extended. Furthermore, when there is provided split torque drive which divides or unites the torque flow through the transmission, better advantage can be taken from both the torque converter and drive ratio gearing to provide a highly efficient transmission of power over a broad torque range. Where the torque converter transmission is to be used in power trains handling large loads, it has been found desirable when matching the transmission to the available power input that the torque converter have high stall torque ratios. Furthermore, it has been found desirable in such applications to utilize the features of twin turbine design, drive ratio gearing and split torque drive.

This invention employs a twin turbin torque converter unit having a driving pump, a pair of turbines driven by the pump and a stator providing torque multiplication, combined with a converter planetary gear set comprising meshing sun, planetary and ring gears to provide increased torque multiplication over an extended range. The first turbine drives the sun gear of the converter planetary gear set, the second turbine drives the carrier and the ring gear is mounted by a one-way brake on the transmission housing. The twin turbine torque converter unit is constructed so that the first turbine carries all the torque at stall and the torque carried by the first turbine gradually decreases until at a predetermined speed ratio between the first turbine and pump the first turbine overspeeds the pump and carries no torque. The second turbine carries no torque at stall and torque carried by the second turbine gradually increases from no torque at stall until at the above-mentioned speed ratio the second turbine carries all the torque transmitted by the converter. The first and second turbines are combined by the converter gear set and act together to provide high torque multiplication by reason of the reduction ratio provided by the converter gearing up to the predetermined speed ratio. Thereafter the first turbine overspeeds the pump and only the second turbine carries the torque of the pump and stator to the carrier of the converter gear set such as in the manner of a three element converter. Output of the twin turbine torque converter unit including the converter gear set to drive ratio gearing is by either output split torque drive or input split torque drive. In one embodiment of the invention the twin turbine torque converter unit including the converter gear set is combined with a three forward speed and reverse gear unit to provide torque converter and reduction gear ratio series drive in low and reverse, a split torque intermediate drive providing torque multiplication in both the torque converter unit and gear unit and a split torque drive in high ratio providing torque multiplication in the torque converter unit and direct drive in the gear unit. The first and second turbines drive the converter gear set carrier which is connected to drive an intermediate shaft. The intermediate shaft drives the sun gear of a first planetary gear set having a carrier connected to the output shaft and a ring gear which is retarded for torque converter drive through the speed reducing ratio of the first gear set in low ratio. The input shaft to the torque converter unit drives through transfer gearing the sun gear of a second planetary gear set which has a carrier connected to the ring gear of the first gear set and a ring gear. The ring gear of the second gear set is retarded in intermediate ratio to provide a direct mechanical input drive through the second gear set to drive the ring gear of the first gear set at a reduced speed ratio while the first and second turbines acting through the converter gear set drive the sun gear of the first gear set which acts as a torque combining gear set. This intermediate drive therefore combines a reduced speed or torque multiplied mechanical drive with the torque converter drive provided by the turbines linked by the converter gear set. In high ratio the input shaft to the torque converter is connected by the transfer gears and by a clutch to the carrier which drives the ring gear of the first or torque combining gear sets at input speed and the torque converter unit acting through the converter gear set drives the sun gear of the torque combining gear set to provide a split torque drive including a torque multiplying drive through the torque converter unit and converter gear set and a direct mechanical drive from the input to the ring gear of the torque combining gear set. The reverse gear set has a sun gear connected to the ring gear of the first gear set and a carrier connected to the output shaft and a ring which is retarded in reverse to provide reverse torque converter and reduction gear drive.

This arrangement provides a reduction gear ratio and torque converter drive in low ratio to obtain full torque multiplication from the twin turbine torque converter unit and converter gear set without direct mechanical drive. In intermediate ratio the torque converter drive including the converter gear set is combined with a reduction gear drive or mechanical torque multiplying drive to provide an intermediate split torque ratio. In high ratio the torque converter drive including the converter gear set is combined with the direct mechanical drive to provide increased proportioned mechanical drive in the split torque drive.

Another embodiment of this invention has the input shaft driving the carrier of a torque splitting planetary gear set having meshing sun, planet and ring gears. The ring gear drives the pump of the twin turbine torque converter unit and the sun gear is drivingly connected to the intermediate shaft. The carrier of the converter gear set linking the twin turbines connects to the intermediate shaft in the manner as described previously. The torque splitting gear set apportions part of the input torque through the twin turbine torque converter unit and converter gear set and the remainder to the intermediate shaft with the intermediate shaft combining the torque carried by the carrier of the converter gear set and the sun gear of the torque splitting gear set. The intermediate shaft drives the sun gear of a first planetary gear set having a carrier connected to the output shaft and a ring gear which is retarded for combined torque converter and mechanical drive through the speed reducing ratio of the first gear set in low ratio. In high ratio the intermediate shaft is connected by a clutch to drive the ring gear of the first gear set at converter output speed. This locks up the first gear set and the combined torque converter and mechanical drive is direct to the output shaft. The reverse gear set has a sun gear connected to the ring gear of the first gear set and a carrier connected to the output shaft and a ring gear to provide in reverse combined torque converter and mechanical drive through the reverse reduction gear drive when the reverse ring gear is held.

This arrangement provides combined torque converter and mechanical drive to the reduction gear drive in low ratio with a portion of the input torque through the torque converter and converter gear set and the remainder around the converter and converter gear set to the reduction gear drive. In high ratio the output shaft is drivingly connected to the converter shaft and drive is by combined torque converter and mechanical drive.

An object of this invention is to provide a twin turbine torque converter unit combined with a converter gear set having the one turbine carrying all the torque at stall and gradually decreasing in torque carrying capacity as its speed increases and the other turbine carrying no torque at stall and having its torque capacity gradually increasing until it carries all the torque, with the two turbines linked together through the sun gear and carrier of the converter planetary gear set to provide a combined variable torque output.

Another object of this invention is to provide a twin turbine torque converter unit combined with a planetary gear set for combining the first turbine output and the second turbine output and a split torque drive unit providing partial hydraulic and mechanical torque transmission between the transmission input and output.

Another object of this invention is to provide a transmission having a torque multiplying planetary gear set having output means and input and reaction means one of which is braked to provide a ratio change and an input drive providing one torque path including a torque converter connected to one input means and another torque path providing a direct mechanical input mechanically independent of the torque converter connected to one input means.

Another object of this invention is to provide a transmission having a torque multiplying planetary gear set having output means and input and reaction means one of which is braked to provide a ratio change and an input drive providing one torque path including a torque converter connected to one input means and another torque path providing a mechanical input connected to one input means and a torque multiplying gear set in one of the torque paths.

Another object of this invention is to provide a twin turbine torque converter unit, a converter gear set linking the twin turbines for variable torque multiplication drive and a multiratio gear unit arranged to provide in low ratio a torque converter and converter gear drive in series with high torque multiplication gear drive, in intermediate ratio a torque converter and converter gear drive combined in parallel with a mechanical drive through a torque multiplying gear ratio and in high ratio a torque converter and converter gear drive combined in parallel with a direct mechanical drive.

Another object of this invention is to provide in a transmission employing a twin turbine torque converter, a converter planetary gear set linking the twin turbines for variable torque multiplication drive and a multiratio gear unit arranged to provide a parallel combined and input driven torque converter and converter gear drive and a mechanical drive in series with high torque multiplication gear drive to provide low ratio and in series with a direct mechanical drive to provide high ratio.

Another object of this invention is to provide a twin turbine torque converter unit and a converter planetary gear set with one turbine driving the sun gear of the converter gear unit, the other turbine driving the carrier which drives an intermediate shaft and the ring gear prevented from rotation in one direction, and a torque combining planetary gear set having a sun gear driven by the intermediate shaft, a carrier connected to an output shaft and a ring gear which is held for low ratio driven by the input shaft to the pump through transfer gearing and a reduction gear train at a reduction ratio in intermediate ratio and driven directly by the transfer gearing and the input shaft at input shaft speed in high ratio.

Another object of this invention is to provide a twin turbine torque converter unit and a converter planetary gear set with one turbine driving the sun gear of the converter gear, the other turbine driving the carrier which is drivingly connected to an intermediate shaft and the ring gear prevented from rotation in one direction and a torque splitting planetary gear set having a sun gear connected to the intermediate shaft, a ring gear connected to the pump of the converter unit and an input driven carrier, and a multiratio gear drive driven by the intermediate shaft providing high torque multiplication gear drive in low and reverse ratios and direct mechanical drive in high ratio.

Another object of this invention is to provide a transmission having a twin turbine torque converter unit including a pump, a pair of turbines and a stator, a converter planetary gear set and a three speed forward gear unit, with the one turbine driving the sun gear of the converter gear set, the other turbine driving the carrier and the ring gear prevented from rotation in one direction, the carrier driving the sun gear of a torque combining planetary gear set with the torque combining gear set having its carrier connected to the output shaft, and the input shaft driving the sun gear of a torque multiplying planetary gear set having a controlled ring gear and a carrier connected to the controlled ring gear of the torque combining gear set, and a clutch operatively connecting the input shaft to the carrier of the torque multiplying gear set.

Another object of this invention is to provide a transmission having a twin turbine torque converter including a pump, a pair of turbines and stator, a converter planetary gear set and a two speed forward gear unit with one turbine driving the sun gear of the converter gear set, the other turbine driving the carrier and the ring gear being prevented against rotation in one direction, the carrier driving an intermediate shaft, and a torque splitting planetary gear set with the input shaft driving the carrier of the torque splitting gear set, the ring gear driving the pump of the converter and the sun gear connected to drive the intermediate shaft, with the intermediate shaft driving the sun gear of a torque multiplying planetary gear set having its carrier connected to the output shaft and a controlled ring gear, and a clutch connecting the intermediate shaft to the controlled ring gear of the torque multiplying gear set to provide direct mechanical drive therethrough.

These and other objects of the invention will be more apparent from the following description and drawing of the preferred embodiments of the invention.

Figure 1:
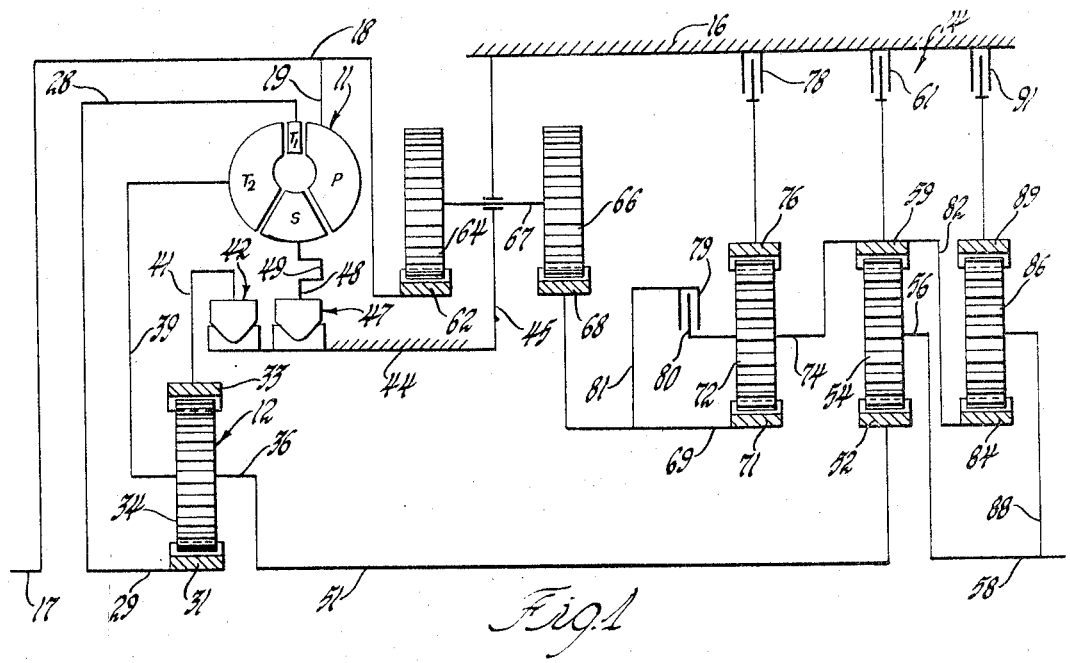
FIGURE 1 is a diagrammatic showing one embodiment of the invention.

The embodiment shown in FIGURE 1 has a twin turbine torque converter unit 11, a converter planetary gear set 12 and a multiratio gear unit 14 located in a stationary transmission housing 16. An input shaft 17 which can be driven by any suitable source of power, such as an internal combustion engine (not shown), is connected by drive connections 18 and 19 to drive or rotate the vaned pump or impeller P of twin turbine torque converter unit 11 which includes a first forwardly rotating vaned turbine $T_1$, a second forwardly rotating vaned turbine $T_2$ and a vaned stator member S. The drive connections 18 and 19 generally also provide the rotating torque converter housing enclosing the torque converter blading. Connected to the first turbine $T_1$ by means of drive connection 28 and a first intermediate shaft 29 is the sun gear 31 of the converter or torque combining and torque multiplying gear set 12 having a ring gear 33, a plurality of planets or pinions 34 meshing with sun gear 31 and ring gear 33, and a carrier 36 which is drivingly connected to the second turbine element $T_2$ by a drive connection 39. Ring gear 33 acts as the reactionary member for the converter gear set 12 and is prevented from rotating in a reverse direction or direction opposite to the forward direction of rotation of the pump P by means of connection 41 and one-way engaging device or brake 42 which is mounted on a hub portion 44 extending from a wall 45 of the stationary transmission housing. Stator member S is mounted on hub portion 44 and is prevented from rotating in a direction opposite to the forward direction of rotation of pump P by means of a one-way engaging device or brake 47 supported on hub portion 44. In order to provide different values of torque multiplication for different driving conditions the angles of the vanes or blades of the stator S may be adjusted. For this purpose each reactionary vane or blade of the stator is fixed to a rotatable shaft 48 having a crank arm 49 and suitable operators, well known to those skilled in the art, position the crank to hold the blades at the desired angles.

The multiratio gear unit 14 has a first or torque combining and torque multiplying gear set and a second or torque multiplying gear set and a reverse gear set. The carrier 36 of the converter planetary gear set is connected to drive a second intermediate shaft 51 and the intermediate shaft drives the sun gear 52 which meshes with the pinions 54 mounted on a carrier 56 which is connected to the output shaft 58. The torque combining and torque multiplying gear set has a ring gear 59 connected to the rotating plate of the low brake 61.

To provide mechanical drive to the multiratio gear unit 14 the input shaft 17 is connected by drive connection 18 to a gear 62 meshing with a gear 64 smaller than gear 62. Gear 64 and a gear 66 identical to gear 64 are connected to a shaft 67 rotatably supported in wall 45.ABear 66 meshes with and drives a gear 68 which is connected by drive sleeve or shaft 69 to drive the sun gear 71 of the torque multiplying planetary gear set. The gear 68 is identical to gear 62 and thus the gears 62–64 and 67–66 provide a 1:1 speed ratio between drive connection 18 and drive sleeve 69 to rotate drive sleeve 69 and sun gear 71 forwardly at the same speed as input shaft 17. The sun gear 71 meshes with the planetary pinions 72 on the carrier 74 which is connected to the ring gear 59 of the torque combining and torque multiplying gear set. The pinions 72 mesh with the ring gear 76 which is connected to the brake plate of the intermediate brake 78.

Direct mechanical drive to ring gear 59 of the torque combining and torque multiplying gear set is by means of a direct drive or high clutch 79 connecting drive connection 81 rotatable with sleeve shaft 69 to a clutch plate 80 rotatable with carrier 74 of the torque multiplying gear set.

The ring gear 59 is connected by drive connection 82 to the sun gear 84 of the reverse gear set. The sun gear 84 meshes with the pinions 86 on the reverse carrier 88 which is connected to the output shaft 58. The reverse ring gear 89 meshes with the pinions 86 and is connected to the rotating plate of the reverse brake 91.

The twin turbine torque converter unit 11 has its vaned members constructed so that the first turbine $T_1$ carries all the torque at stall which is just prior to rotation with the output shaft sufficiently loaded and a drive ratio engaged. As the first turbine gradually increases in speed its torque carrying capacity gradually decreases until at a predetermined speed ratio between the first turbine $T_1$ and the pump P the first turbine overspeeds the pump and carries no torque. The second turbine $T_2$ operates in a manner opposite that of the first turbine $T_1$ in that it carries no torque at stall and its torque carrying capacity gradually increases from no torque at stall as its speed increases and approaches the speed of the first turbine until at the aforementioned speed ratio between the first turbine and the pump it carries all the torque transmitted across the converter which is at a value lower than the gear multiplied torque at stall but still some value above the input torque to the pump. Thus in a range from stall to the aforementioned speed ratio the torque output from the first turbine $T_1$ to the sun gear 31 of the converter gear set is gradually diminishing from a maximum which occurs at stall while the torque output from the second turbine $T_2$ to the carrier 36 of the converter gear set is increasing from a minimum until at the aforementioned speed ratio between the first turbine $T_1$ and pump P the torque output from the second turbine $T_2$ to the carrier 36 represents the total torque across the converter. The torque carried by the second turbine $T_2$ thereafter decreases as the second turbine approaches the speed of the pump since the converter provides decreasing torque multiplication as the coupling speed is approached between the second turbine and pump like as in a three member converter unit. At stall since the second turbine $T_2$ carries little or no torque, torque input to the converter gear set is largely through the sun gear 31 and since ring gear 33 is prevented from reverse rotation gear 33 acts as the reactionary member to provide a reduction ratio between the sun gear and carrier of the converter. Thus the converter gear set and twin turbine torque converter unit give a combined stall torque ratio equivalent to the torque amplified in the converter and carried by the first turbine $T_1$ multiplied by the reduction ratio between the sun gear and carrier of the converter gear set with no rotation being imparted to the carrier by the second turbine $T_2$. As the first turbine $T_1$ begins to rotate from stall and increase in speed in the forward direction its torque capacity gradually decreases while on the other hand the torque capacity of the second turbine $T_2$ gradually increases and thus the torque output of the twin turbine converter unit and converter gear set in this range is equivalent to the sum of the torque carried by the first turbine $T_1$ multiplied by the reduction ratio of the converter gear set plus the torque carried by the second turbine $T_2$. Thus there is provided a smooth transition between effective operation of the first and second turbines and gradual decreasing of torque amplification by the combined converter unit and converter gear set. When the predetermined speed ratio between the first turbine $T_1$ and pump P is reached, since the first turbine no longer carries any torque and the second turbine $T_2$ carries all the torque across the converter there is no longer torque input to the sun gear 31 of the converter gear set. Thus there is no torque multiplication derived from the converter gear set and only the torque carried by second tubine $T_2$ is transmitted through carrier 36 of the converter gear set to the intermediate shaft 51. When this condition occurs since the ring gear 33 is prevented by the one-way brake device 42 from rotation only in the reverse direction, the ring gear is free to rotate in the forward direction in which the second turbine is rotating thus resulting in free rotation of the first turbine. The second turbine continues to carry the torque across the converter with the torque multiplication continuously decreasing with increasing speed of the second turbine with the stator S continuing to remain active up to this time. When the second turbine attains a speed substantially equal to the pump speed, there is no reaction at the stator S and the stator is free to rotate in the forward direction since brake 47 only prevents reverse rotation. Thereafter the converter acts as a fluid coupling device and the speed ratio between the pump and intermediate shaft is substantially 1:1.

This arrangement provides a reduction gear ratio and torque converter drive in low ratio when the brake 61 is applied to obtain full torque multiplication from the twin turbine torque converter unit and converter gear set without direct mechanical drive. In intermediate ratio with the intermediate brake 78 applied the torque converter drive together with the converter gear set is combined with a reduction gear drive or mechanical torque multiplying drive to provide an intermediate split torque ratio. In high ratio with the high clutch 79 applied the torque converter drive is combined with the direct mechanical drive to provide increased proportioned mechanical drive in the split torque drive. In reverse ratio with the brake 91 applied the torque converter drive through the converter gear set is to a reverse reduction gear ratio without dirct mechanical drive and full torque multiplication from the converter and converter gear set is obtained.

When the converter is constructed such that the first turbine carries 1.775 times the pump torque and the converter or torque combining and multiplying gear set linking the first and second turbines has a 2.903 reduction ratio as determined by the sun gear having 31 teeth and the ring gear having 59 teeth, the combined converter and converter gear set gives a stall torque ratio of 5.15:1. Furthermore when each of the first torque combining and multiplying and the second torque multiplying planetary gear sets employed in this transmission have a sun gear with 50 teeth and a ring gear with 102 teeth, the division of input torque for drive operation through shafts 69 and 51 is fixed at 40.2% mechanical on shaft 69 and 59.8% hydraulic on shaft 51 in intermediate range and 67.1% mechanical on shaft 69 and 32.9% hydraulic on shaft 51 in high range. In low range the drive is 100% hydraulic as the direct or high clutch and intermediate brake connected to the second torque multiplying planetary gear set are disengaged releasing the mechanical drive. Thus the effectiveness of the torque converter for all purposes, for example torque multiplication and torque transmission, is greatest in low range where maximum multiplication is needed and diminishes with each increase of gear range to a minimum in high range where maximum efficiency is needed.

Figure 2:
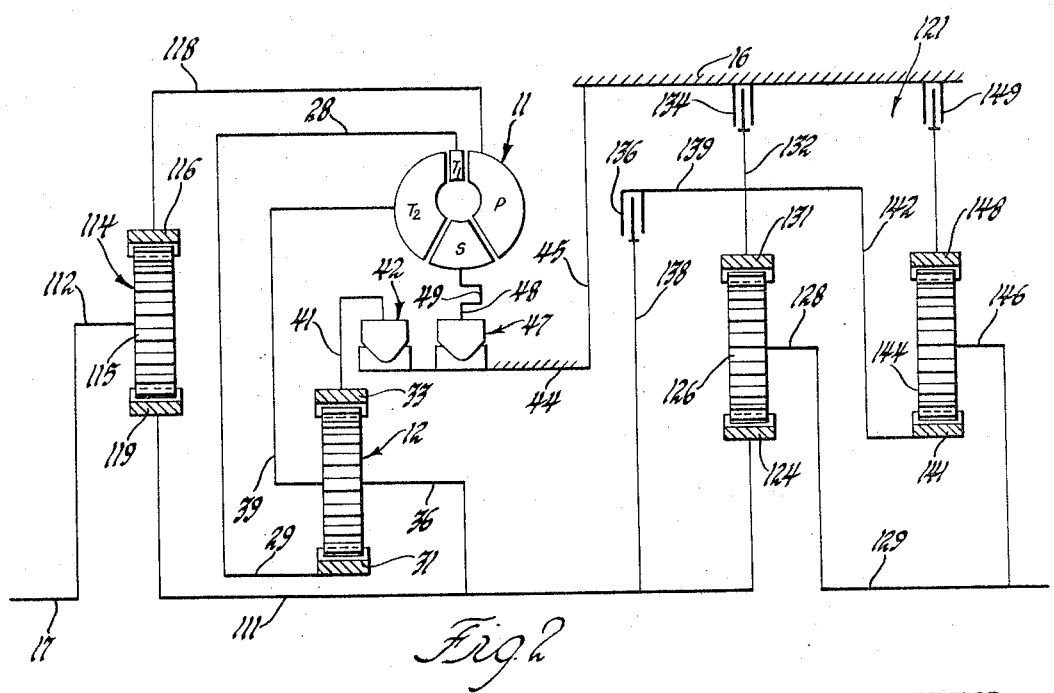
FIGURE 2 is a diagrammatic showing another embodiment of the invention.

The embodiment illustrated in FIGURE 2 features the same converter unit and converter gear set arrangement shown in FIGURE 1 including the input shaft and stationary transmission housing and therefore these parts are identified by the same letters and numerals. This embodiment splits the input torque from the input shaft 17 and apportions part of the torque through the twin turbine torque converter unit 11 and converter gear set 12 and the remainder around the twin turbine torque converter unit directly to an intermediate shaft 111. The input shaft 17 is connected to drive the carrier 112 of a torque splitting or torque dividing planetary gear set 114 having pinions 115 meshing with a ring gear 116 connected by a drive connection 118 to the pump P of the converter unit 11 and a sun gear 119 connected to the shaft 111.

A multiratio gear unit 121 located in the stationary transmission housing 16 has a torque multiplying or reduction planetary gear set and a reverse planetary gear set. The intermediate shaft 111 is connected to drive the sun gear 124 of the torque multiplying gear set which meshes with the pinions 126 mounted on the carrier 128. Carrier 128 is drivingly connected to the output shaft 129 and the torque multiplying gear set has a ring gear 131 connected to the rotating plate 132 of the low brake 134.

For direct drive or high the torque multiplying gear set is locked up by high clutch 136 connecting the rotating clutch plate 138 connected to intermediate shaft 111 to a drive connection 139 connected to plate 132 and thus to ring gear 131.

The ring gear 131 is connected to the sun gear 141 of the reverse gear set by means of plate 132 and drive connection 142. The sun gear 141 meshes with the pinions 144 on the reverse carrier 146 which is connected to the output shaft 129. The reverse ring gear 148 is connected to the rotating plate of the reverse brake 149.

In this arrangement a constant percentage of the input torque from the input shaft 17 is fed through the twin turbine torque converter unit 11 in each of the speed ratio ranges and this percentage of input torque is determined by the torque splitting planetary gear set 114. In low ratio with the low brake 134 applied the twin turbine torque converter unit which is in series with the converter or torque combining and torque multiplying gear set is combined with mechanical drive through the splitter gear set 114 by the intermediate shaft 111 and this combined arrangement is in series relationship with a reduction gear drive or mechanical torque multiplying drive to provide a low split torque ratio drive. In high with the high clutch 136 applied the torque multiplying gear set is locked up and the twin turbine torque converter unit in series with the converter gear set and combined with mechanical drive through the torque splitting planetary gear set provides split torque drive directly to the output shaft. In each of these ranges the twin turbine torque converter unit and converter gear set operate in the same manner from stall to coupling as that of the embodiment of FIGURE 1 and therefore it is believed unnecessary to describe the operation again.

Since the converter unit and converter gear set arrangement shown in FIGURE 2 is the same as shown in FIGURE 1, this transmission may also have a combined converter unit and converter gear set giving a stall torque ratio of 5.15:1. Furthermore when the torque splitting planetary gear set employed in this transmission has a sun gear with 47 teeth and a ring gear with 75 teeth, the splitting of input torque to the intermediate shaft 111 by the splitter gear set is fixed at 61.5% hydraulic on ring gear 116 and 38.5% mechanical on sun gear 119.

As described above the input split torque scheme of the embodiment of FIGURE 2 has a constant percentage of the input torque which is determined by the splitter planetary gear set fed through the converter in each of the drive ranges. In contrast the embodiment shown in FIGURE 1 is of the output split torque scheme and the percentage of the input torque fed through the converter varies depending on the range in which the unit is operating.

The above-described preferred embodiments are illustrative of the invention which it will be appreciated may be modified within the scope of the appended claims.

I claim:
1. In a transmission,
  (a) an input member, an output member and a torque converter,
  (b) a first torque multiplying planetary gear set having input means, output means and another means,
  (c) said output means being connected to said output member,
  (d) said first gear set being operable to provide drive to said output member when both said input means and said another means are driven,
  (e) first input drive means including said torque converter operatively connecting said input member to said input means to provide a first torque path,
  (f) second input drive means operatively connecting said input member to said another means to provide a second torque path,
  (g) and a second torque multiplying planetary gear set in said first torque path comprising a sun gear connected to be driven by said torque converter, a ring gear, a one-way brake connected to said ring gear and a carrier having pinions meshing with said sun gear and ring gear and connected to be driven by said torque converter and connected to drive said input means of said first gear set.
2. The invention defined in claim 1,
  (h) and said second input drive means including torque multiplying means to provide torque multiplication between said input member and said another means.
3. The invention defined in claim 1,
  (h) and said second input drive means providing a direct drive.
4. In a transmission,
  (a) an input member, an output member and an intermediate member,
  (b) a torque converter having a pump, first and second turbines and stator,
  (c) a first planetary gear set having a sun gear member, a ring gear member and a carrier member having planetary pinions meshing with said sun and ring gear members,

(d) drive means operatively connecting said input member to said pump,
(e) said first turbine being connected to said sun gear member of said first gear set,
(f) said carrier member of said first gear set being connected to said second turbine and said intermediate member,
(g) a permanently grounded one-way brake connected to hold said ring gear member of said first gear set against rotation to provide a reduction ratio for multiplying the torque carried by said first turbine,
(h) a second planetary gear set having a sun gear member, a ring gear member and a carrier member having planetary pinions meshing with said sun and ring gear members,
(i) said intermediate member being connected to one member of said second gear set,
(j) another member of said second gear set being connected to said output member,
(k) and means to retard the third member of said second gear set to provide a reduction ratio for torque multiplication and low ratio.

5. The invention defined in claim 4,
(l) and said drive means connecting said input member to said pump including a third planetary gear set having a sun gear member, a ring gear member and a carrier member having planetary pinions meshing with said sun and ring gear members,
(m) said input member being connected to one member of said third gear set,
(n) another member of said third gear set being connected to said intermediate member,
(o) the third member of said third gear set being connected to said pump,
(p) and means selectievly operatively connecting said third member of said second gear set to said intermediate member to provide high ratio.

6. In a transmission,
(a) an input member, an output member and an intermediate member,
(b) a torque converter having a pump, first and second turbines and stator,
(c) a first planetary gear set having a sun gear member, a ring gear member and a carrier member having planetary pinions meshing with said sun and ring gear members,
(d) drive means operatively connecting said input member to said pump,
(e) said first turbine being directly connected to said sun gear member of said first gear set,
(f) said carrier member of said first gear set being connected to said second turbine and said intermediate shaft,
(g) a permanently grounded one-way brake connected to hold the ring gear member of said first gear set against rotation in one direction to provide a reduction ratio for multiplying the torque carried by said first turbine,
(h) a second planetary gear set having a sun gear member, a ring gear member and a carrier member having planetary pinions meshing with said sun and ring gear members,
(i) said intermediate member being connected to said sun gear member of said second gear set,
(j) said carrier member of said second gear set being connected to said output member,
(k) and means to retard said ring gear member of said second gear set to provide low ratio.

7. The invention defined in claim 6,
(l) and said drive means connecting said input member to said pump included a third planetary gear set having a sun gear member, a ring gear member and a carrier member having planetary pinions meshing with said sun and ring gear members,
(m) said input member being connected to said carrier member of said third gear set,
(n) said sun gear member of said third gear set being connected to said intermediate member,
(o) said ring gear member of said third gear set being connected to said pump,
(p) and means selectively operatively connecting said ring gear member of said second gear set to said intermediate member to provide high ratio.

8. In a transmission,
(a) an input member, an output member and an intermediate member,
(b) a torque converter having a pump, first and second turbines and stator,
(c) a first planetary gear set having a sun gear member, a ring gear member and a carrier member having planetary pinions meshing with said sun and ring gear members,
(d) drive means operatively connecting said input member to said pump,
(e) said first turbine being connected to one member of said first gear set,
(f) another member of said first gear set being connected to said second turbine and said intermediate shaft,
(g) means to hold the third member of said first gear set against rotation in one direction to provide a reduction ratio for multiplying the torque carried by said first turbine,
(h) a second planetary gear set having a sun gear member, a ring gear member and a carrier member having planetary pinions meshing with said sun and ring gear members,
(i) said intermediate member being connected to one member of said second gear set,
(j) another member of said second gear set being connected to said output member,
(k) means to retard the third member of said second gear set to provide low ratio,
(l) a third planetary gear set having a sun gear member, a ring gear member and a carrier member having planetary pinions meshing with said sun and ring gear members,
(m) said third member of said second gear set being connected to one member of said third gear set,
(n) another member of said third gear set being connected to said output member,
(o) and means to retard the third member of said third gear set to provide reverse ratio.

9. The invention defined in claim 8,
(p) and said drive means connecting said input member to said pump including a fourth planetary gear set having a sun gear member, a ring gear member and a carrier member having planetary pinions meshing with said sun and ring gear members,
(q) said input member being connected to one member of said fourth gear set,
(r) another member of said fourth gear set being connected to said intermediate member,
(s) the third member of said fourth gear set being connected to said pump,
(t) and means selectively operatively connecting said third member of said second gear set to said intermediate member to provide high ratio.

10. In a transmission,
(a) an input member, an output member and an intermediate member,
(b) a torque converter having a pump, a pair of turbines and a stator,
(c) said pump being connected to and driven by said input member,
(d) said stator being connected to a one-way brake to prevent reverse rotation and to provide variable torque multiplying fluid drive between said pump and said turbines, (e) a drive train including first torque multiplying means operatively connecting said turbines to said intermediate member so that the torque carried by one of said turbines is delivered directly to said intermediate member and the torque carried by the other of said turbines is multiplied and delivered thus multiplied to said intermediate member, (f) second torque multiplying means operatively connecting said intermediate member to said output member operable to multiply the torque carried by said intermediate member and delivers the torque thus multiplied to said output member to provide converter drive, (g) an all mechanical drive train including third torque multiplying means operatively connecting said input member to said second torque multiplying means to provide an all mechanical drive between said input member and said second torque multiplying means, (h) and said second and third torque multiplying means being conjointly operable to provide combined mechanical and converter drive to said output member.

11. In a transmission, (a) an input shaft, an output shaft and an intermediate shaft, (b) a torque converter having a pump, a pair of turbines and a stator, (c) said pump being connected to and driven by said input shaft, (d) said stator being connected to a one-way brake to prevent reverse rotation and to provide variable torque multiplying fluid drive between said pump and said turbines, (e) a first planetary gear set having a sun gear member, a ring gear member and a carrier member having planetary pinions meshing with said sun and ring gear members, (f) one of said turbines being connected to one member of said first gear set, (g) another member of said first gear set being connected to the other of said turbines and said intermediate shaft, (h) means to hold the third member of said first gear set to prevent reverse rotation whereby said first gear set is operative to provide a reduction ratio for multiplying the torque carried by said one turbine and delivered to said intermediate shaft, (i) a second planetary gear set having a sun gear member, a ring gear member and a carrier member having planetary pinions meshing with said sun and ring gear members, (j) one member of said second gear set being connected to said output shaft for driving said output shaft when another member of said second gear set is driving and the third member of said second gear set is held and when both said another and third members of said second gear set are driving, (k) said intermediate shaft being connected to drive said another member of said second gear set to provide converter drive, (l) drive means including torque multiplying means operatively connecting said input shaft to said third member of said second gear set operable to provide, in a first condition, a high torque multiplying drive for providing a drive to said output shaft having a high proportion of converter drive and a low proportion of mechanical drive and, in a second condition, a lower torque multiplying drive for providing a drive to said output shaft having a low proportion of converter drive and a high proportion of mechanical drive, (m) said drive means having means to interrupt drive from said input shaft to said third member of said second gear set, (n) and means to hold said third member of said second gear set to provide full converter drive.

12. In a transmission, (a) an input shaft, an output shaft and an intermediate shaft, (b) a torque converter having a pump, a pair of turbines and a stator, (c) a first planetary gear set having a sun gear member, a ring gear member and a carrier member having planetary pinions meshing with said sun and ring gear members, (d) said carrier being connected to and driven by said input shaft, (e) said pump being connected to and driven by said ring gear of said first gear set, (f) a second planetary gear set having a sun gear member, a ring gear member and a carrier member having planetary pinions meshing with said sun gear and ring gear members, (g) one of said turbines connected to said sun gear member of said second gear set, (h) the other of said turbines being connected to said carrier member of said second gear set, (i) said carrier member of said second gear set and said sun gear member of said first gear set being connected to said intermediate shaft whereby said first gear set apportions part of the torque carried by said input shaft to said torque converter and the remainder to said intermediate shaft to provide input split torque drive, (j) a third planetary gear set having a sun gear member, a ring gear member and a carrier member having planetary pinions meshing with said sun and ring gear members, (k) said sun gear member of said third gear set being connected to said intermediate shaft, (l) said carrier member of said third gear set being connected to said output shaft, (m) and means to retard said ring gear of said third gear set to provide split torque drive to said output shaft.

13. The invention defined in claim 12 and the torque apportioned by said first gear set to said torque converter is larger than that apportioned to said intermediate shaft.

14. In a transmission, (a) an input shaft, an output shaft and an intermediate shaft, (b) a torque converter having a pump, a pair of turbines and a stator, (c) said pump being driven by said input shaft, (d) said stator being connected to a one-way brake to prevent reverse rotation and to provide variable torque multiplying fluid drive between said pump and said turbine, (e) said turbines being constructed to alternately and conjointly carry the torque across said converter, (f) a first planetary gear set having a sun gear member, a ring gear member and a carrier member having planetary pinions meshing with said sun and ring gear members, (g) said carrier member being connected to one of said turbines and to said intermediate shaft, (h) said sun gear member of said first gear set being connected to the other of said turbines, (i) said ring gear member of said first gear set being connected to a one-way brake to prevent reverse rotation whereby said stator, in a first condition, provides that said intermediate shaft is driven by said other turbine at a reduced speed and by said one turbine at the same speed and, in a second condition, is driven only by said one turbine at the same speed, (j) a second planetary gear set having a sun gear member, a ring gear member and a carrier member having planetary pinions meshing with said sun and ring gear members, (k) said sun gear member of said second gear set being connected to and driven by said intermediate shaft,
(l) said output shaft being connected to said carrier member of said second gear set,
(m) said second gear set providing converter drive to said output shaft when both said sun and ring gear members of said second gear set are driving and when said sun gear member of said second gear set is driving and said ring gear member is held,
(n) means to retard said ring gear member of said second gear set to provide reduction drive between said intermediate shaft and said output shaft to provide low ratio full converter drive,
(o) a third planetary gear set having a sun gear member, a ring gear member and a carrier member having planetary pinions meshing with said sun gear member and said ring gear member,
(p) said carrier member of said third gear set being connected to said ring gear member of said second gear set,
(q) drive means operatively connecting said sun gear member of said third gear set to said input shaft,
(r) means to retard said ring gear member of said third gear set to provide a high proportion of converter drive and a low proportion of mechanical drive to said output shaft,
(s) and means for selectively operatively connecting said ring gear member of said second gear set to said input shaft to provide a drive to said output shaft having a low proportion of converted drive and a high proportion of mechanical drive.

15. In a transmission,
(a) an input shaft, an ouput shaft and an intermediate shaft,
(b) a torque converter having a pump, a pair of turbines and a stator,
(c) said pump being connected to be driven by said input shaft,
(d) said stator being connected to a one-way brake to prevent reverse rotation and to provide variable torque multiplying fluid drive between said pump and said turbines,
(e) a first planetary gear set having a sun gear member, a ring gear member and a carrier member having planetary pinions meshing with said sun and ring gear members,
(f) said carrier member of said first gear set being connected to be driven by one of said turbines and connected to drive said intermediate shaft,
(g) the other of said turbines being connected to drive said sun gear member of said first gear set,
(h) said ring gear member of said first gear set being connected to a one-way brake to prevent reverse rotation,
(i) a second planetary gear set having a sun gear member, a ring gear member and a carrier member having planetary pinions meshing with said sun and ring gear members,
(j) said sun gear member of said second gear set being connected to be driven by said intermediate shaft,
(k) said output shaft being connected to be driven by said carrier member of said second gear set,
(l) means to retard said ring gear member of said second gear set to provide low ratio,
(m) a third planetary gear set having a sun gear member, a ring gear member and a carrier member having planetary pinions meshing with said sun and ring gear members,
(n) drive means operatively connecting said sun gear member of said third gear set to said input shaft,
(o) said carrier member of said third gear set being connected to said ring gear member of said second gear set,
(p) means to retard said ring gear member of said third gear set to provide intermediate ratio,
(q) means operative to selectively operatively connect said carrier member of said third gear set to said input shaft to provide high ratio,
(r) a reverse planetary gear set having a sun gear member, a ring gear member and a carrier member having planetary pinions meshing with said sun and ring gear members,
(s) said sun gear member of said reverse gear set being connected to said ring gear member of said second gear set,
(t) said carrier member of said reverse gear set being connected to drive said output shaft,
(u) and means to retard said ring gear member of said reverse gear set to provide reverse ratio.

16. In a transmission,
(a) an input shaft, an output shaft and an intermediate shaft,
(b) a torque splitting planetary gear set having a sun gear member, a ring gear member and a carrier member having planetary pinions meshing with said sun and ring gear members,
(c) said carrier member of said torque splitting gear set being driven by said input shaft,
(d) a torque converter having a pump, a pair of turbines and a stator,
(e) said stator being mounted to prevent reverse rotation and to provide variable torque multiplying fluid drive between said pump and said turbines when said pump is driven,
(f) a converter planetary gear set having a sun gear member, a ring gear member and a carrier member having planetary pinions meshing with said sun and ring gear members,
(g) one of said turbines being connected to drive said sun gear member of said converter gear set,
(h) the other of said turbines being connected to drive said carrier member of said converter gear set,
(i) means to prevent reverse rotation of said ring gear member of said converter gear set,
(j) said ring gear member of said torque splitting gear set being connected to drive said pump,
(k) said carrier member of said converter gear set and said sun gear member of said torque splitting gear set being connected to drive said intermediate shaft whereby said torque splitting gear set splits the torque from said input shaft between said torque converter and said intermediate shaft to provide input split torque drive,
(l) a low planetary gear set having a sun gear member, a ring gear member and a carrier member having planetary pinions meshing with said sun and ring gear members,
(m) said sun gear member of said low gear set being driven by said intermediate shaft,
(n) said carrier member of said low gear set being connected to drive said output shaft,
(o) means to retard said ring gear member of said low gear set to provide low ratio,
(p) means operative to selectively connect said ring gear member of said low gear set to said intermediate shaft to provide high ratio,
(q) a reverse planetary gear set having a sun gear member, a ring gear member and a carrier member having planetary pinions meshing with said sun and ring gear members,
(r) said sun gear member of said reverse gear set being connected to said ring gear member of said low gear set,
(s) said carrier member of said reverse gear set being connected to drive said output shaft,
(t) and means to retard said ring gear member of said reverse gear set to provide low ratio.

17. In a transmission,
(a) an input member, an output member and an intermediate member, (b) a torque converter having a pump, first and second turbines and stator,
(c) a first planetary gear set having a sun gear member, a ring gear member and a carrier member having planetary pinions meshing with said sun and ring gear members,
(d) drive means operatively connecting said input member to said pump,
(e) said first turbine being connected to one member of said first gear set,
(f) another member of said first gear set being connected to said second turbine and said intermediate member,
(g) means to hold the third member of said first gear set against rotation to provide a reduction ratio for multiplying the torque carried by said first turbine,
(h) a second planetary gear set having a sun gear member, a ring gear member and a carrier member having planetary pinions meshing with said sun and ring gear members,
(i) said intermediate member being connected to one member of said second gear set,
(j) another member of said second gear set being connected to said output member,
(k) means to retard the third member of said second gear set to provide a reduction ratio for torque multiplication and low ratio,
(l) a third planetary gear set having a sun gear member, a ring gear member and a carrier member having planetary pinions meshing with said sun and ring gear members,
(m) means operatively connecting said input member to one member of said third gear set,
(n) another member of said third gear set being connected to said third member of said gear second set,
(o) means to retard the third member of said third gear set to provide a reduction ratio for torque multiplication conjointly with torque combining in said second gear set and intermediate ratio,
(p) and means selectively operatively connecting said input member to said another member of said third gear set to provide high ratio.

18. In a transmission,
(a) an input member, an output member and an intermediate member,
(b) a torque converter having a pump, first and second turbines and stator,
(c) a first planetary gear set having a sun gear member, a ring gear member and a carrier member having planetary pinions meshing with said sun and ring gear members,
(d) drive means operatively connecting said input member to said pump,
(e) said first turbine being connected to said sun gear member of said first gear set,
(f) said carrier member of said first gear set being connected to said turbine and said intermediate shaft,
(g) means to hold the ring gear member of said first gear set against rotation in one direction to provide a reduction ratio for multiplying the torque carried by said first turbine,
(h) a secondary planetary gear set having a sun gear member, a ring gear member and a carrier member having planetary pinions meshing with said sun and ring gear members,
(i) said intermediate member being connected to said sun gear member of said second gear set,
(j) said carrier member of said second gear set being connected to said output member,
(k) means to retard said ring gear member of said second gear set to provide low ratio,
(l) a third planetary gear set having a sun gear member, a ring gear member and a carrier member having planetary pinions meshing with said sun and ring gear members,
(m) means operatively connecting said input member to said sun gear member of said third gear set,
(n) said carrier member of said third gear set being connected to said ring gear member of said second gear set,
(o) means to retard said ring gear member of said third gear set to provide intermediate ratio,
(p) and means selectively operatively connecting said input member to said carrier member of said third planetary gear set to provide high ratio.

19. In a transmission,
(a) an input member, an output member and an intermediate member,
(b) a torque converter having a pump, first and second turbines and stator,
(c) a first planetary gear set having a sun gear member, a ring gear member and a carrier member having planetary pinions meshing with said sun and ring gear members,
(d) drive means operatively connecting said input member to said pump,
(e) said first turbine being connected to one member of said first gear set,
(f) another member of said first gear set being connected to said second turbine and said intermediate shaft,
(g) means to hold the third member of said first gear set against rotation in one direction to provide a reduction ratio for multiplying the torque carried by said first turbine,
(h) a second planetary gear set having a sun gear member, a ring gear member and a carrier member having planetary pinions meshing with said sun and ring gear members,
(i) said intermediate member being connected to one member of said second gear set,
(j) another member of said second gear set being connected to said output member,
(k) means to retard the third member of said second gear set to provide low ratio,
(l) a third planetary gear set having a sun gear member, a ring gear member and a carrier member having planetary pinions meshing with said sun and ring gear members,
(m) said third member of said second gear set being connected to one member of said third gear set,
(n) another member of said third gear set being connected to said output member,
(o) means to retard the third member of said third gear set to provide reverse ratio,
(p) a fourth planetary gear set having a sun gear member, a ring gear member and a carrier member having planetary pinions meshing with said sun and ring gear members,
(q) means operatively connecting said input member to one member of said fourth gear set,
(r) another member of said fourth gear set being connected to said third member of said second gear set,
(s) means to retard the third member of said fourth gear set to provide intermediate ratio,
(t) and means selectively operatively connecting said input member to said another member of said fourth gear set to provide high ratio.

References Cited by the Examiner
UNITED STATES PATENTS

| | | | |
|---|---|---|---|
| 2,572,007 | 10/1951 | Burtnett | 74—688 |
| 2,674,137 | 4/1954 | Place | 74—688 |
| 2,851,906 | 9/1958 | De Lorean | 74—677 |
| 2,855,803 | 10/1958 | Knowles | 74—677 |
| 2,861,474 | 11/1958 | Moore | 74—688 |
| 2,959,985 | 11/1960 | Moore | 74—677 |

(Other references on following page)

UNITED STATES PATENTS

| | | | |
|---|---|---|---|
| 2,964,975 | 12/1960 | De Lorean | 74—688 |
| 3,021,727 | 2/1962 | Kelley et al. | 74—677 |
| 3,039,326 | 6/1962 | Christenson | 74—688 |
| 3,051,017 | 8/1962 | Flinn | 74—677 |
| 3,062,074 | 11/1962 | Hause et al. | 74—671 |
| 3,063,308 | 11/1962 | Wayman | 74—677 |
| 3,084,569 | 4/1963 | Hause | 74—688 |
| 3,159,051 | 12/1964 | Herndon et al. | 74—688 |
| 3,159,052 | 12/1964 | O'Malley et al. | 74—688 |
| 3,205,730 | 9/1965 | Hause | 74—688 |

DAVID J. WILLIAMOWSKY, *Primary Examiner.*

DON A. WAITE, THOMAS C. PERRY, *Examiners.*